United States Patent
Wu et al.

(10) Patent No.: US 6,824,039 B2
(45) Date of Patent: Nov. 30, 2004

(54) LEAD FREE TIN BASED SOLDER COMPOSITION

(75) Inventors: Ping Wu, Singapore (SG); Kewu Bai, Singapore (SG)

(73) Assignee: Institute of High Performance Computing (SG)

( * ) Notice: Subject to any disclaimer, the term of this patent is extended or adjusted under 35 U.S.C. 154(b) by 0 days.

(21) Appl. No.: 10/215,517

(22) Filed: Aug. 9, 2002

(65) Prior Publication Data

US 2003/0183674 A1 Oct. 2, 2003

(30) Foreign Application Priority Data

Mar. 26, 2002 (SG) ..................................... 200201728-3

(51) Int. Cl.[7] .......................... B23K 31/02; C22C 13/00
(52) U.S. Cl. ..................... 228/56.3; 228/245; 420/557; 428/622
(58) Field of Search ................. 228/245–262, 228/56.3; 420/557, 560, 561, 562; 428/622

(56) References Cited

U.S. PATENT DOCUMENTS

| | | |
|---|---|---|
| 4,806,309 A | 2/1989 | Tulman |
| 5,328,660 A | 7/1994 | Gonya et al. |
| 5,344,607 A | 9/1994 | Gonya et al. |
| 5,730,932 A | 3/1998 | Sarkhel et al. |
| 5,942,185 A | 8/1999 | Nakatsuka et al. |
| 6,086,687 A * | 7/2000 | Oud et al. |
| 6,228,322 B1 | 5/2001 | Takeda et al. |
| 6,231,691 B1 | 5/2001 | Anderson et al. |
| 6,241,942 B1 | 6/2001 | Murata et al. |
| 6,334,905 B1 | 1/2002 | Hanawa et al. |

FOREIGN PATENT DOCUMENTS

| | | | |
|---|---|---|---|
| JP | 50056347 A | * | 5/1975 |
| JP | 50085541 A | * | 7/1975 |
| JP | 51119651 A | * | 10/1976 |
| JP | 405050286 A | * | 3/1993 |
| TW | 431931 | | 5/2001 |
| WO | 98/32886 | | 7/1998 |

OTHER PUBLICATIONS

Adtew et al., in Mat. Sci. and Eng. 27 (2000) 95–141.
Miller et al., "A Viable Tin–Lead Solder Substitute: An–Ag–Cu", Journal of Electronic Materials, Jul. 1994.
Kattner et al., "Calculations of Phase Equilibria in Candidate Solder Alloys", Z. Metallkd. 92 (2001) Jul. issue.

* cited by examiner

*Primary Examiner*—Kiley Stoner
(74) *Attorney, Agent, or Firm*—Beyer Weaver & Thomas LLP

(57) ABSTRACT

Lead-free solder alloys based on a Sn—Ag—Mg system are disclosed. The alloy compositions have a melting temperature close to 183° C. and a similar surface tension to that of Sn—Pb solder, and can thus be a readily substituted for conventional Sn—Pb solders. P may be added to the alloy compositions to reduce its tendency of oxidation.

37 Claims, 1 Drawing Sheet

LEAD FREE TIN BASED SOLDER COMPOSITION

FIELD OF THE INVENTION

The present invention relates to lead-free solder alloy compositions. More specifically, the present invention relates to lead free solder alloy compositions that provide a direct substitute of Sn—Pb solder used in electronic assemblies.

BACKGROUND OF THE INVENTION

Sn—Pb solder, with a eutectic composition Sn-37Pb (e.g., 63 wt % Sn, 37 wt % Pb) or near eutectic composition (e.g., 60 wt % Sn-40 wt % Pb), has a eutectic melting temperature of 183° C. As one of the primary components of solders, lead (Pb) reduces the melting point of tin (Sn), increases its strength, improves it ductility, and provides excellent thermal cycling fatigue resistance of the solder. In addition to these technical advantages, lead is a readily available and low cost metal. Sn—Pb solders are therefore widely used in electronic assemblies throughout the world.

Lead-free soldering is driven by increased concerns about the impact of lead on health and the environment. In the United States, the electronics manufacturing industry has come to a consensus view as to the ultimate abandonment of tin-lead solders reflected in the Lead Exposure Act (S.729) and the Lead Tax Act (H.R. 2479, S. 1347). Starting Jan. 1, 2004, European nations will be requiring the use of lead-free solder alloys in all electronic assemblies. In Japan, similar legislation is proposed that will prohibit lead from being sent to land fills and other waste disposal sites.

In response to the lead-free soldering issue, massive research efforts worldwide have been carried out to identify a suitable substitute. The work is generally targeted to the development of a direct substitute for Sn-/37Pb solder for surface mount technology (SMT) manufacturing. Since a solder with higher melting temperature will have a major impact on the other polymeric materials used in microelectronic assembly and encapsulation, an acceptable substitute should offer a melting point around 183° C. and possess eutectic properties. The desired features of a lead-free alternative to Pb/Sn eutectic in the assembly include: lowest melting temperature, minimal freezing range, ease of manufacture, ease of recycling, minimum materials cost and compatibility of suitable flux with a No Clean process.

A recent review by Abtew et al. in Mat. Sci. and Eng. 27(2000)95–141 revealed that approximately 70 Pb-free solder alloys have been proposed so far by a combination of researchers and manufacturers. The majority of the alloys are based on Sn, In and Bi, with Sn as matrix metal. Other alloying elements are Zn, Ag, Sb, Cu and Mg. The Sn rich compositions are considered to be most likely candidates. The alloys investigated by some organizations are listed in Table 1.

TABLE 1

| ORGANIZATION | ALLOY |
| --- | --- |
| NEMI (National Electronics Manufacturing Initiative), US | SnCu0.7 |
| | SnAg3.5 |
| | SnAgCu |
| NCMS (National Center for Manufacturing Science), US | SnAg3.5 |
| | SnBi58 |
| | SnAg3.2Bi4.8 |

TABLE 1-continued

| ORGANIZATION | ALLOY |
| --- | --- |
| | CASTIN |
| | SnAg3.4Bi4.8 |
| | SnIn20Ag2.8 |
| | (Indalloy) |
| | SnAg3.5Cu0.5Zn1.0 |
| ITRI (International Tin Research Institute), UK | SnAgCu |
| | SnAg2.5Cu0.8Sb0.5 |
| | SnCu0.7 |
| | SnAg3.5 |
| | SnBiAg |
| | SnBiZn |

Note:
Alloy compositions are given in the form "SnAg2.5Cu0.8Sb0.5," which means 2.5% Ag, 0.8% Cu, and 0.5% Sb (weight percent), with the leading element (in this case, Sn) making up the balance to 100%.

Note: Alloy compositions are given in the form "SnAg2.5Cu0.8Sb0.5," which means: 2.5% Ag, 0.8% Cu, and 0.5% Sb (weight percent), with the leading element (in this case, Sn) making up the balance to 100%.

Many lead free solder alloys have been patented for electronic applications. For example, U.S. Pat. No. 5,730,932 to Sarkhel, et al., suggests certain solder alloys containing Sn, Bi, In and Ag. Also, U.S. Pat. No. 5,328,660 to Gonya, et al., suggests a quaternary solder alloy of 78.4% Sn, 2% Ag, 9.8% Bi and 9.8% In (weight percentage). In U.S. Pat. No. 4,806,309 to Tulman, a tin base lead-free solder composition containing Bi, Ag, and Sb is proposed. In U.S. Pat. No. 5,344,607 to Gonya, et al., a Sn rich ternary solder alloy containing Sn, Bi and In is disclosed. Moreover, U.S. Pat. No. 6,231,691 to Anderson, et al., provides a Sn—Ag—Cu alloy modified by a low level of element Ni and Fe.

Sn—Zn—Bi solders are disclosed in U.S. Pat. No. 5,942,185 to Nakatsuka et al., U.S. Pat. No. 6,334,905 to Hanawa et al. and Taiwanese Pat. No. TW431931. Ternary solders comprising Sn—Zn—Bi as main components are hopeful from the point of melting temperature. In order to prevent Zn oxidation of Sn—Zn—Bi—Ag—Cu—In solder, addition of less than 1% P is disclosed in U.S. Pat. No. 6,241,942 to Murata et al. U.S. Pat. No. 6,228,322 to Takeda et al. claims that Sm, Ga or a mixture of these elements with other rare earth elements can be added to Sn—Ag alloy or Sn—Ag—Bi—Cu alloys to enhance the mechanical strength of lead-free solder. Lead-free tin alloys comprising In, Al, Mg and Zn are provided in the world patent WO 98/32886.

It is found that, among 67 lead-free alloys compositions published, there are 9 alloys that have eutectic melting temperatures close to that of Sn—Pb solder. However, the major components of these alloys are comprised of the elements bismuth and indium. These alloys are not considered to be a real alternative of Sn—Pb solder for the following reasons: a) the price of indium is high; b) large amounts of bismuth and indium tend to lead to low melting phases formed in the system, which have a bad influence on the reliability of the solder pad, and raise concerns about thermal fatigue at higher temperature; c) it becomes difficult to recover usably purified materials from the solder alloy for recycling use when bismuth or indium is used as an additive element of the solder.

On the other hand, lead-free alloys based on Sn—Ag, Sn—Cu and Sn—Ag—Cu eutectic systems have melting points in the 217 to 227° C. range, which is significantly higher than that of 63Sn37Pb. These alloys are thus not a suitable direct substitute of conventional Sn—Pb solder (e.g., Sn-37Pb).

As indicated by Abtew et al., in Mat. Sci. and Eng. 27(2000)95–141 there is believed to be no single alloy that can be simply "dropped in" as one-for-one replacement for Sn—Pb solder. The alloy systems investigated thus far are limited, and a more wide-ranging investigation is necessary.

Potential lead-free alloys with high percentage of tin reported by the Litton company are listed in Table 2.

TABLE 2

Potential lead-free alloys with high percentage of tin

| | |
|---|---|
| +silver (Ag) | 0.1 to 5.0% |
| +bismuth (Bi) | 1.0 to 5.0% |
| +antimony (Sb) | 0.2 to 5.0% |
| +copper (Cu) | 0.2 to 2.0% |
| +zinc (Zn) | 0.5 to 9.0% |
| +indium (In) | 0.5 to 20.0% |
| +magnesium (Mg) | 0.5 to 2.0% |

As shown above, the lead-free solder alloy selection continues to be the research subject of many works. Recently, the thermodynamic equilibrium calculation has become one of the effective theoretical tools in identification of lead-free solder. For example, a preliminary calculation of the ternary phase diagram for Sn—Ag—Cu as described by Miller et al in "A Viable Tin-Lead Solder Substitute: Sn—Ag—Cu", Journal of Electronic Materials, July 1994, Volume 23, Number 07, p.595–602, indicated the occurrence of a ternary eutectic reaction at 217.4° C. for a composition of Sn-3.8Ag-2.3Cu(wt. %) using existing binary alloy thermodynamic and phase equilibrium without ternary interaction parameters. The results are in excellent agreement with the experiments. Furthermore, the surface tensions of Sn-based solder alloys have been predicted successfully by using the Butler equation.

In view of the foregoing, a lead free solder alloy composition that provides a direct substitute of conventional Sn—Pb solder used in electronic assemblies is desired.

SUMMARY OF THE INVENTION

The invention relates, in one embodiment, to a lead free solder composition. The lead free solder composition includes Sn, Ag, and Mg, and has a melting temperature under 200° C. In most cases, the composition includes between about 3.0 to about 14.0 wt % Ag and about 1.9 to about 3.2 wt % Mg. In other cases, the melting temperature is close to the melting temperature (e.g., 183° C.) of conventional leaded solders.

The invention relates, in another embodiment, to an electronic structure. The electronic structure includes a first electronic component that is electrically bonded to a second electronic component by a solder alloy consisting essentially of 3.0 to about 14.0 wt % Ag and about 1.9 to about 3.2 wt % Mg and balance Sn.

The invention relates, in another embodiment, to a method of joining two electronic components. The method includes providing a first and a second electronic component to be joined. The method also includes connecting the components with a solder consisting essentially of about 3.0 to about 14.0 wt % Ag and about 1.9 to about 3.2 wt % Mg and balance Sn.

The invention relates, in another embodiment, to a lead free solder composition. The lead free solder composition includes Sn, Zn, and Mg. In most cases, the composition has a property similar to a corresponding property of a conventional Sn—Pb solder (e.g., melting temperature, mushy range, surface tension, wetting ability and the like).

DETAILED DESCRIPTION OF THE INVENTION

Figure 1:
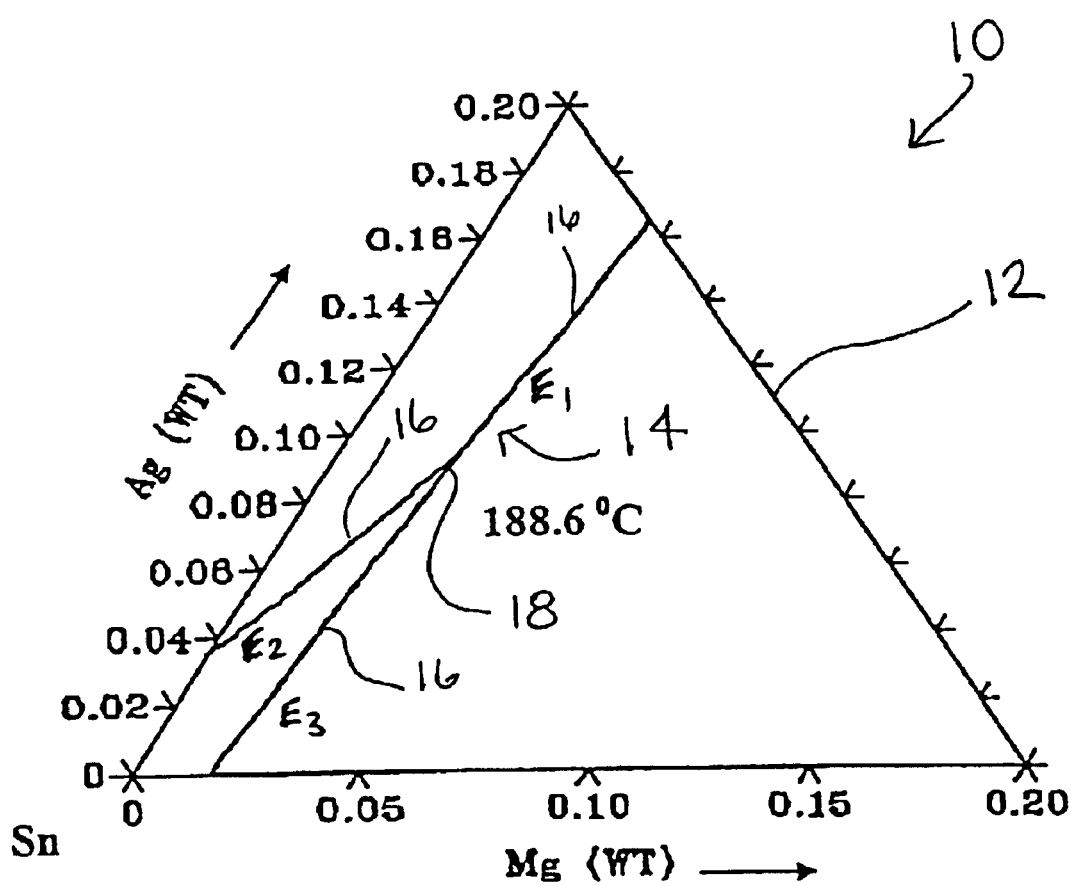
FIG. 1 is a triangular diagram showing the liquidus projection on the Sn—Ag—Mg phase diagram, in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention provides a lead free solder alloy composition that works as a direct substitute of lead based solders. One aspect of the present invention pertains to lead free solders that approach conventional lead solders (e.g., Sn—Pb) in performance such as melting temperature, surface tension, mushy range, wetting ability and the like. Another aspect of the present invention pertains to lead free solders that exhibit favorable mechanical properties. Another aspect of the present invention pertains to lead free solders that utilize fewer than four components. Yet another aspect of the present invention pertains to lead free solders that may be used in existing machinery configured for lead based solders (e.g., Sn—Pb). The lead free solders described herein are particularly suitable for electronic applications such as surface mount technology manufacturing.

For purposes of clarity, the term "melting temperature" generally refers to the temperature at which a solid transforms into a liquid. The term "surface tension" generally refers to the stretching force required to form a liquid film. The term "wetting ability" generally refers to the ability of liquids to wet a surface. Moreover, the term "mushy range" generally refers to the range of temperatures between the "solidus" temperature, which is the highest temperature at which an alloy is completely solid (i.e., the point where melting starts when the alloy is heated) and the liquidus temperature, which is the lowest temperature at which the alloy is completely liquid (i.e., the point where solidifying starts as the alloy is cooled). "Mushy range" may also be referred to as the "pasty range."

The present invention provides a lead free solder that comprises tin (Sn), silver (Ag) and magnesium (Mg). The composition of the above elements may be widely varied. For example, the lead free solder may comprise between about 3.0 to about 14.0 wt % Ag, between about 1.9 to about 3.2 wt % Mg, and a balance of Sn. In one example, the eutectic microstructure of these elements is formed by the Sn-rich phase of the body-centered tetragonal structure (BCT_A5), $Ag_3Sn$ and $Mg_2Sn$. The body-centered tetragonal structure (BCT) is an example of a unit cell. The unit cell is the smallest structure that repeats itself by translation throughout the crystal. "A5" and in "BCT_A5" is the respective Strukturbericht designation accorded to the structure.

Properties of compositions in accordance with the present invention may be elucidated by application of computational thermodynamics. Computational thermodynamics is the discipline by which phase diagrams are generated by analysis of the basic thermodynamic properties of the system. Computational thermodynamics enables the prediction of some features of the system which are not easily measured, as well as to predict phase diagrams of complex multicomponent systems.

More particularly, ternary eutectic phase topology and thermodynamic calculation may be useful in the identification of compositions in accordance with the present invention. According to the ternary eutectic topology, a lowest ternary eutectic system requires three sub-binary systems with invariant reactions, especially the eutectic reaction. The thermo-chemical properties such as melting temperature and surface tension can then be predicted by thermodynamic calculation (e.g., phase equilibrium calculation). Thermodynamic calculation provides an extremely useful tool for obtaining quantitative information about higher order or multicomponent systems such as ternary systems (as the thermodynamic properties of multicomponent systems are difficult to obtain experimentally).

The thermodynamic calculation may be performed using a variety of techniques. In one embodiment, the thermodynamic calculation is performed using the CALPHAD (Computer Calculation of Phase Diagrams) technique. In the CALPHAD technique, thermodynamic models consistent with the experimental binary data are first obtained, then a standard thermodynamic extrapolation method is used to calculate the ternary system, i.e., measured values from binary mixtures are used to estimate the thermodynamic properties of multicomponent systems. In one implementation, thermodynamic self-consistency modeling parameters are obtained by coupling the experimental data from the phase diagrams and thermochemistry. The phase diagram of the multicomponent systems are then calculated using these model parameters from lower order systems with different extrapolation models. The extrapolation models can be grouped into two categories: symmetric (e.g., Redlich-Kister-Kohler, Redlich-Kister-Muggianu) and asymmetric (e.g., Toop, Hillert).

In one particular CALPHAD technique, the melting points of a ternary alloy are calculated using Redlich-Kister-Muggianu thermodynamic model. The Redlich-Kister-Muggianu model is one of several empirical predictive methods used to represent the thermodynamic properties of a ternary system based on the corresponding values from three binary systems. The Redlich-Kister-Muggianu model is as follows:

$$G^E = \frac{4x_1x_2}{(1+x_1-x_2)(1+x_2-x_1)}G^E_{12}\left(\frac{1+x_1-x_2}{2}; \frac{1+x_2-x_1}{2}\right) +$$
$$\frac{4x_2x_3}{(1+x_2-x_3)(1+x_3-x_2)}G^E_{23}\left(\frac{1+x_2-x_3}{2}; \frac{1+x_3-x_2}{2}\right) +$$
$$\frac{4x_3x_1}{(1+x_3-x_1)(1+x_1-x_3)}G^E_{31}\left(\frac{1+x_3-x_1}{2}; \frac{1+x_1-x_3}{2}\right)$$

where $G^E$ is the ternary excess Gibbs energy of a phase,
$x_i$ is the mole fraction of component i,
$G^E_{ij}$ is the binary excess Gibbs energy, described by the Redlich-Kister polynomial:

$$G^E_{ij} = x_ix_j(a_0 + a_1(x_i - x_j) + a_2(x_i - x_j)^2)$$

where $a_n$ is a binary interaction parameter.

FIG. 1 is a partial ternary phase diagram of a Sn—Ag—Mg system 10, in accordance with one embodiment of the present invention. By way of example, the ternary phase diagram may be formed using the CALPHAD technique described above. As is generally well known, ternary phase diagrams allow multi-component phase relationships to be visualized on a triangular plot 12 (a two dimensional representation of a three component system). Ternary phase diagrams generally plot the composition of the system at a particular temperature. The compositions of the ternary system are represented in the triangular plot with each corner representing an element and each side representing a binary system. The ternary compositions are represented by points within the triangle. The relative proportions of the elements are given by the relative lengths of the perpendiculars from the given point to the side of the triangle opposite the appropriate element.

In FIG. 1, the ternary phase diagram plots the composition of the Sn—Ag—Mg system 10 at the ternary eutectic temperature of the system. Also in FIG. 1, only the liquidus projection 14 of the Sn—Ag—Mg system 10 in the tin rich part of the Sn—Ag—Mg system 10 is shown. The liquidus projection 14 represents the liquidus temperature of the three component mixture as a function of the composition. For example, the vertex of the triangular plot represents pure Sn, and the two of the sides extending therefrom represent the varying compositions of Ag and Mg added thereto. As shown, the compositions of Ag and Mg are measured by weight percentages in an increasing manner along the sides of the triangular plot 12.

The liquidus projection 14 generally consists of cotectic or boundary lines 16 that represent where two or more phases are precipitating at the same time (e.g., the intersection of the liquidus surfaces for two solids, the melting points of pure phases or double saturation points). As shown, the cotectic lines 16 extend from the sides of the triangular plot 12 to a point of convergence thereby forming three regions (which represent three different compositions E1, E2 and E3). The point of convergence is generally called the ternary eutectic point 18. At the ternary eutectic point 18, a liquid phase is in equilibrium with three solid phases and the overall composition of the solid is the same as the overall composition of the fluid. The ternary eutectic temperature is the lowest temperature of the system that the liquid can exist. Below the ternary eutectic temperature only solid phases exist. In the illustrated embodiment, the ternary eutectic composition of the Sn—Ag—Mg system 10 is Sn87.8Ag9.48Mg2.66 (wt %) at 188.6° C. As should be appreciated, this temperature is close to that of Sn-37Pb solder. The proportion of Ag to Mg in the ternary system may be derived from the ratio between the lengths of the lines associated with E2 and E3.

Although only one temperature is shown in FIG. 1, it should be noted that the ternary system may be fully represented by a succession of diagrams, one for each temperature. By way of example, Table 3 illustrates the results from successive diagrams of Te +5° C. or Te +10° C., where Te represents the ternary eutectic temperature of the system, i.e., 188.6° C., and the +5 and +10 represent the increase in temperature therefrom. In Table 3, three different compositions at Te +5° C. and Te +10° C. are calculated. The compositions belong to three different two-phase regions: $Ag_3Sn$—$Mg_2Sn$, $Ag_3Sn$—BCT and BCT—$Mg_2Sn$. At each of these compositions, the system is fully liquid. As shown in Table 3, the corresponding composition ranges for the isotherms (Te +5° C.) and (Te +10° C.) at the illustrated phase regions are 1.89 to 3.27 wt. % Mg, 3.04 to 14.03 wt. % Ag and balance Sn. Using these ranges, the ratios of Ag to Mg may be between about 4.25:1 and about 1.5:1.

TABLE 3

| Phase Regions | Melting temperature (° C.) | Composition (wt %) Mg | Composition (wt %) Ag |
|---|---|---|---|
| LIQUID Ag3Sn Mg2Sn | | 2.94 | 11.43 |
| LIQUID Ag3Sn BCT_A5 | Te + 5 | 2.28 | 8.50 |
| LIQUID BCT_A5 Mg2Sn | | 2.34 | 5.85 |
| LIQUID Ag3Sn Mg2Sn | | 3.27 | 14.03 |
| LIQUID Ag3Sn BCT_A5 | Te + 10 | 1.89 | 7.49 |
| LIQUID BCT_A5 Mg2Sn | | 2.07 | 3.04 |

In one embodiment, the Butler's equation is used to calculate the surface tension of the liquid alloy. Surface tension is generally defined as the stretching force required to form a liquid film. The property of surface tension is typically responsible for the ability of liquids to wet a surface (e.g., wetting ability). Using the Butler's equation, the surface tension of the alloy composition shown in FIG. 1 is predicted as 525.92 mN/m. The result is close to the experimental data of Sn-37Pb solder, which provides a surface tension of 500 mN/m at a melting peak of 184° C.

To elaborate, the Butler's equation links the surface tension of pure components to their partial excess Gibbs energies in the bulk phase and in the hypothetical surface phase. The equation governing the surface tension σ of a liquid alloy is as follows:

$$\sigma = \sigma_i + \frac{RT}{S_i} \ln\left(\frac{x_i^s}{x_i^b}\right) + \frac{1}{S_i}(\overline{G}_i^{E,S} - \overline{G}_i^{E,b})$$

where $\sigma_i$ is the surface tension of pure liquid i,
$S_i$ is the surface monolayer area of pure liquid i,
$x_i^s$ is the mole fraction of i in the monolayer,
$x_i^b$ is the mole fraction of i in the bulk,
$\overline{G}_i^{E,s}$ the partial excess Gibbs energy of i in the ternary monolayer,
$\overline{G}_i^{E,b}$ the partial excess Gibbs energy of i in the bulk phase, and
$\overline{G}_i^{E,s}$ and $\overline{G}_i^{E,b}$ are described by the same thermodynamic model.
$\overline{G}_i^{E,s}$ is obtained empirically from $$\overline{G}_i^{E,s} = 0.75 \overline{G}_i^{E,b}$$

$S_I$ can be obtained from $$S_I = 1.091 N_0^{1/3} V_i^{2/3}$$

where $N_0$ is Avogadro's number, and
$V_i$ is the molar volume of pure liquid i.

Among these parameters, $\sigma_I$ and $V_i$ come from experimental data (C. J. Smithells, Metals Reference Book, vol.2, 5th ed., Butterworths, London (1976)), while $\overline{G}_i^{E,b}$ is described by the Redlich-Kister-Muggianu model.

It has been conventionally recognized that oxygen in the solder alloys makes the solder fragile and remarkably reduces the wetting ability of the solder. As such, phosphorous may be added to lead-free alloys as an oxygen scavenger or deoxizer (magnesium may serve a similar purpose). In one embodiment, during the preparation of the lead-free alloy, phosphorous of about 0.01 to about 0.1% by weight is added to the melted materials. The oxygen in the melted materials typically bonds with the phosphorous thereby allowing the oxygen to be removed when the phosphorous floats on the surface of melted materials as slag.

The solder of the present invention may be used in the same manner as conventional Sn—Pb solder. For example, the solder of the present invention may be used in electronic applications. In one embodiment, the solder is used to electrically bond a first electronic component to a second electronic component. The first and second components may generally be selected from IC chips, chip carriers, circuit boards and/or the like. The joining of two components is generally accomplished by melting the solder, placing the solder on desired contacts (e.g., bonding pads, leads, wires), and cooling the solder to the point where it solidifies. In another embodiment, the solder is used to produce an electrical connection point on an electronic component. For example, the solder may be formed into a ball on a ball grid array of a chip scale package. In order to produce the connection point, the solder is generally deposited on a substrate such as a chip or circuit board. The depositing of the solder is generally accomplished by melting the solder, placing the solder on desired contacts (e.g., bonding pads, leads, wires), and cooling the solder to the point where it solidifies. In one embodiment, soldering is carried out in substantially non-oxidizing environment such as nitrogen and argon gas, so that the wetting fault and bonding fault due to oxidation can be prevented.

The advantages of the present invention are numerous. Different embodiments or implementations may have one or more of the following advantages. One advantage of the invention is that the alloys described herein approach conventional lead solders in performance (e.g., melting temperature, surface tension, mushy range and/or wetting ability). As should be appreciated, some previously proposed alloys such as Sn—Ag, Sn—Cu and Sn—Ag—Cu alloys do not behave like conventional Sn—Pb solders. Another advantage of the invention is that the alloys described herein exhibit favorable mechanical properties. In particular, the small mush ranges and compounds in the alloy systems tend to stabilize the microstructure by refining grain and reducing composition macro-segregation, which have an important impact on the mechanical properties of the solder. Another advantage of the invention is that the alloys described herein provide a lead-free solder that can be affordable and of less than 4 components which makes it easy to manufacture. As should be appreciated, previously proposed alloys that contain indium tend to be expensive (e.g., indium is very expensive and a limited mineral reserve). Another advantage of the invention is that the alloys described herein has similar properties to that of conventional Sn—Pb solders, and therefore it is a suitable replacement for Sn—Pb solders in electronic applications. As should be appreciated, a disadvantage with other previously proposed lead-free solders, which have been proposed for electronic application, is that the existing machinery used for Sn—Pb solder may not be used with the lead-free replacements. Furthermore, it is generally said that if the soldering temperature for electronic part lowers by 10° C., the service life of the electronic part become double. Thus, a lower eutectic melting temperature of the solder alloy may be very effective.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A lead free solder composition consisting essentially of a balance of Sn, between about 3 to about 14 wt % Ag, and between about 1.9 to about 3.2 wt % Mg, and having a melting temperature under 200° C.

2. The composition as recited in claim 1 wherein the composition has a thermal property similar to a corresponding property of a Sn-Pb solder.

3. The composition as recited in claim 1 wherein the composition has a melting temperature within 5% of the melting temperature of Sn-37Pb solder.

4. The composition as recited in claim 1 wherein the composition has a melting temperature within 2% of the melting temperature of Sn-37Pb solder.

5. The composition as recited in claim 1 wherein the melting temperature is between about 188 and about 198° C.

6. The composition as recited in claim 1 wherein the surface tension of the composition is about 525 mN/m.

7. The composition as recited in claim 1 wherein tire composition provides a direct substitute for Sn-Pb solder used in electronic assembly manufacturing processes.

8. The composition as recited in claim 1 wherein the composition does not include indium or bismuth.

9. A lead tree solder composition comprising Sn, Ag, Mg and P, and having a melting temperature under 200° C.

10. The composition as recited in claim 9 comprising between about 0.01 to about 0.1 wt % P.

11. The composition as recited in claim 9 comprising between about 3.0 to about 14.0 wt % Ag and about 1.9 to about 3.2 wt % Mg.

12. The composition as recited in claim 11 comprising a balance of Sn.

13. The composition as recited in claim 1 comprising less than 14.0 wt % Ag and less than 3.2 wt % Mg.

14. The composition as recited in claim 1 comprising greater than 3.0 wt % Ag and greater than 1.9 wt % Mg.

15. The composition as recited in claim 1 comprising about 2.94 wt % Mg and about 11.43 wt % Ag.

16. The composition as recited in claim 1 comprising about 2.28 wt % Mg and about 8.50 wt % Ag.

17. The composition as recited in claim 1 comprising about 2.34 wt % Mg and about 5.85 wt % Ag.

18. The composition as recited in claim 1 comprising about 3.27 wt % Mg and about 14.03 wt % Ag.

19. The composition as recited in claim 1 comprising about 1.89 wt % Mg and about 7.49 wt % Ag.

20. The composition as recited in claim 1 comprising about 2.07 wt % Mg and about 3.04 wt % Ag.

21. The composition as recited in claim 1 comprising about 87.8 wt % Sn, about 9.4 wt % Ag and about 2.66 wt % Mg.

22. The composition as recited in claim 1 wherein the ratio of Ag to Mg is between about 4.25:1 to about 1.5:1.

23. The composition as recited in claim 1 wherein the composition forms a joint between two electronic components.

24. The composition as recited in claim 1 wherein the composition forms connection points on an electronic component.

25. An electronic structure comprising a first electronic component electrically bonded to a second electronic component by a solder alloy consisting essentially of about 3.0 to about 14.0 wt % Ag, about 1.9 to about 3.2 wt % Mg and balance Sn, and having a melting temperature under 200° C.

26. The electronic structure as recited in claim 25 wherein the first and second components are selected from IC chips, chip carriers or circuit boards.

27. A method of joining two electronic components, comprising:

providing a first and a second electronic component to be joined; and connecting the components with a solder consisting essentially of about 3.0 to about 14.0 wt % Ag, about 1.9 to about 3.2 wt % Mg and balance Sn, and having a melting temperature under 200° C.

28. A lead free solder composition comprising Sn, Ag, and Mg, wherein the composition has properties similar to corresponding properties of Sn-37Pb or Sn-40Pb solder, the composition having a melting temperature similar to the melting temperature of the conventional Sn-Pb solder, the melting temperature being between about 188 and about 198° C.

29. The composition as recited in claim 28 wherein the composition has a surface tension similar to the surface tension of the conventional Sn-Pb solder.

30. The composition as recited in claim 29 wherein the surface tension of the composition is about 525 mN/m.

31. The composition as recited in claim 1 wherein the composition has a mushy range or wetting abilities similar to the conventional Sn-Pb solder.

32. The composition as recited in claim 1 wherein the melting temperature of the composition is no greater than about 200° C.

33. The composition as recited in claim 25 wherein a melting temperature of the composition is no greater than about 200° C.

34. The composition as recited in claim 27 wherein a melting temperature of the composition is no greater than about 200° C.

35. The composition as recited in claim 28 wherein the composition comprising Sn, Ag and Mg has a melting temperature, surface tension, mushy range and wetting ability similar to the melting temperature, surface tension, mushy range and wetting ability of the Sn-37Pb or Sn-40Pb solder.

36. The composition as recited in claim 28 wherein the composition consists essentially of about 3 to about 14 wt % Ag, about 1.9 to about 3.2 wt % Mg and balance Sn.

37. The composition as recited in claim 2 wherein the composition has a microstructure of body-centered tetragonal Sn matrix including $Mg_2Sn$ and $Ag_3Sn$ intermetallic compounds.

* * * * *